United States Patent
Johnston et al.

(10) Patent No.: US 11,457,262 B2
(45) Date of Patent: Sep. 27, 2022

(54) ON-DEMAND VIDEO NEWS PROGRAMMING

(71) Applicant: Thomson Reuters Enterprise Centre GmbH, Zug (CH)

(72) Inventors: Eric Johnston, Chatham, NJ (US); Isaac Showman, New York, NY (US); Rahul Powar, London (GB)

(73) Assignee: Thomson Reuters Enterprise Centre GmbH, Zug (CH)

( * ) Notice: Subject to any disclaimer, the term of this patent is extended or adjusted under 35 U.S.C. 154(b) by 0 days.

(21) Appl. No.: 14/854,104

(22) Filed: Sep. 15, 2015

(65) Prior Publication Data

US 2016/0112737 A1    Apr. 21, 2016

Related U.S. Application Data

(60) Provisional application No. 62/065,279, filed on Oct. 17, 2014.

(51) Int. Cl.
*H04N 21/258*    (2011.01)
*H04N 21/658*    (2011.01)
(Continued)

(52) U.S. Cl.
CPC ..... *H04N 21/25891* (2013.01); *H04N 21/251* (2013.01); *H04N 21/4312* (2013.01);
(Continued)

(58) Field of Classification Search
CPC .......... H04N 21/251; H04N 21/25891; H04N 21/4312; H04N 21/44204; H04N 21/4667;
(Continued)

(56) References Cited

U.S. PATENT DOCUMENTS 5,684,918 A * 11/1997 Abecassis ............... A63F 13/10
348/14.01
9,678,637 B1 * 6/2017 Brothers ........ H04N 21/234336
(Continued)

FOREIGN PATENT DOCUMENTS

AU    2015334020 A1    5/2017
CN    1524236 A    8/2004
(Continued)

OTHER PUBLICATIONS

International Preliminary Report on Patentability issued in corresponding PCT Application No. PCT/US2015/050100, dated Apr. 27, 2017, 12 pages.
(Continued)

*Primary Examiner* — Nasser M Goodarzi
*Assistant Examiner* — Jaycee Imperial
(74) *Attorney, Agent, or Firm* — Antonio Papageorgiou; Lombard & Geliebter LLP

(57) ABSTRACT

Systems and technologies for providing an on-demand personalized news program are disclosed. The system and technologies allow an end user to create a news program that best matches the end user's tastes and preferences. To achieve this, one aspect of the disclosure relates to systematic personalization. Systematic personalization involves determining an end user's interests based on an assessment of user behavior as it relates to accessible content. The personalization process may also provide content to users that have been editorially curated.

7 Claims, 15 Drawing Sheets

(51) Int. Cl.
*H04N 21/442* (2011.01)
*H04N 21/81* (2011.01)
*H04N 21/25* (2011.01)
*H04N 21/431* (2011.01)
*H04N 21/466* (2011.01)
*H04N 21/472* (2011.01)
*H04N 21/475* (2011.01)

(52) U.S. Cl.
CPC ... *H04N 21/44204* (2013.01); *H04N 21/4667* (2013.01); *H04N 21/4756* (2013.01); *H04N 21/47202* (2013.01); *H04N 21/6582* (2013.01); *H04N 21/812* (2013.01); *H04N 21/8133* (2013.01)

(58) Field of Classification Search
CPC ......... H04N 21/47202; H04N 21/4756; H04N 21/6582; H04N 21/812; H04N 21/8133
USPC ........................................................ 725/14
See application file for complete search history.

(56) References Cited

U.S. PATENT DOCUMENTS

| | | | | |
|---|---|---|---|---|
| 2003/0167467 | A1* | 9/2003 | Allen | H04N 7/163 725/47 |
| 2005/0010950 | A1* | 1/2005 | Carney | H04N 21/23424 725/45 |
| 2005/0028194 | A1* | 2/2005 | Elenbaas | G06F 17/30787 725/32 |
| 2005/0138049 | A1* | 6/2005 | Linden | G06F 17/30867 |
| 2006/0047701 | A1* | 3/2006 | Maybury | G06F 17/30828 |
| 2007/0220552 | A1* | 9/2007 | Juster | H04N 21/4825 725/46 |
| 2008/0281974 | A1 | 11/2008 | Slothouber et al. | |
| 2008/0316183 | A1* | 12/2008 | Westerman | G06F 3/0416 345/173 |
| 2012/0158521 | A1* | 6/2012 | McCullen | G06Q 30/0273 705/14.69 |
| 2012/0243850 | A1* | 9/2012 | Basra | H04N 5/76 386/248 |
| 2012/0278329 | A1* | 11/2012 | Borggaard | G06F 17/30699 707/738 |
| 2013/0117161 | A1 | 5/2013 | Waidmann et al. | |
| 2013/0179925 | A1* | 7/2013 | Woods | H04N 21/42209 725/42 |
| 2013/0246452 | A1* | 9/2013 | Vadrevu | G06F 17/30867 707/769 |
| 2013/0347037 | A1 | 12/2013 | Soroushian | |
| 2014/0191981 | A1* | 7/2014 | Ramasarma | G06F 3/0481 345/173 |
| 2014/0201780 | A1* | 7/2014 | Wong | H04N 21/482 725/32 |
| 2014/0222831 | A1 | 8/2014 | Ramkumar et al. | |
| 2014/0282656 | A1* | 9/2014 | Belyaev | H04N 21/25841 725/14 |
| 2015/0312609 | A1* | 10/2015 | Hoctor | H04N 21/251 725/14 |
| 2015/0331863 | A1* | 11/2015 | Kao | G06N 5/048 707/609 |
| 2015/0339033 | A1* | 11/2015 | Arnold | G06F 3/04842 715/854 |
| 2016/0014482 | A1* | 1/2016 | Chen | G11B 27/031 386/241 |
| 2016/0066064 | A1* | 3/2016 | Chesluk | H04N 21/25891 725/93 |
| 2016/0112737 | A1* | 4/2016 | Johnston | H04N 21/44204 725/14 |

FOREIGN PATENT DOCUMENTS

| | | |
|---|---|---|
| CN | 103313108 B | 9/2013 |
| CN | 103621104 A | 3/2014 |
| WO | 2013/086245 A1 | 6/2013 |
| WO | 2016/060768 A1 | 4/2016 |

OTHER PUBLICATIONS

International search report and written opinion issued in corresponding PCT Application No. PCT/US2015/050100, dated Dec. 11, 2015, 12 pages.

Extended European Search Report Received for European Application No. 15850181.7, dated Mar. 22, 2018, 9 pages.

First Examination Report dated Feb. 1, 2018, received in corresponding AU Patent Application No. 2015334020, 7 pages.

Ha, Anthony, "Swell Launches A Personalized App For News Radio Listening", Tech Crunch Jun. 27, 2013, accessed online at <https//techcrunch.com/2013/06/27/swell-personal-news-radio>, 2 pages.

Rackspace Studios, SFO, "Scoble and Concept IO's Swell Radio", <URL: https://www.youtube.com/watch?v=gAImkVExksw> published on Jun. 27, 2013.

* cited by examiner

GULF LEADERS TRY TO NUDGE OBAMA ON IRAN

ON-DEMAND VIDEO NEWS PROGRAMMING

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to this document: Copyright © 2015 Thomson Reuters.

CROSS-REFERENCE TO RELATED APPLICATION

This application claims priority to U.S. Provisional Application No. 62/065,279, filed Oct. 17, 2014, entitled "On-Demand Video News Programming". Further, this application is related to U.S. patent application Ser. No. 14/478,131, filed on Sep. 5, 2014, entitled "MULTIVARIATE A/B TESTING OF MOBILE APPLICATIONS". Each of the applications referred to in this paragraph is incorporated herein by reference in its entirety.

TECHNICAL FIELD

This disclosure relates to a news program, and more particularly methods and systems for generation of an on-demand personalized news program.

BACKGROUND

Typically, a news program is a program accessible via television or other electronic form of communication directed to reporting current events. It comprises stories or segments relating to various topics and can be transmitted live or be previously recorded. Typically, the traditional television news program is transmitted via a regularly scheduled mass broadcast.

Over the recent past, television audiences have been in decline and the business of television has changed. The manner by which individuals stay informed of current events has also evolved. Television and news consumption is now different due to improvements in technology and the increased usage of cell phones, tablets or other mobile platforms. Today, we live in a world of mobility and more people are turning to the Internet, online video, or streaming services from anywhere, instead of tuning into a television. Frequently, we are first informed of breaking news from a mobile notification rather than from a news television broadcast. Social media has also become increasingly important to the content experience.

Accordingly, there is a need for improved systems and techniques for generating a news program, and more particularly adopting, developing, and deploying new technologies to generate and deliver a news program.

SUMMARY

Systems and technologies for providing an on-demand personalized news program are disclosed. The system and technologies allow an end user to create a news program that best matches the end user's tastes and preferences. To achieve this, one aspect of the disclosure relates to systematic personalization.

Systematic personalization involves determining an end user's interests based on an assessment of user behavior (either implicitly or explicitly) as it relates to accessible content. With the added capability of a trusted news source, such as REUTERS®, the personalization process may also provide content to users that have been editorially curated. The addition of editorially curated content may ensure that individual news stories included in news programs generated for a user is not only of interest to that particular user, but also provides the user with an overview of what's going on in the world.

Preferences of a user may be stored in a unique profile associated with each user.

Various aspects of the system relate to an on-demand personalized news program. For example, according to one aspect, a method includes receiving an electronic request to generate an on-demand personalized news program, the electronic request comprising a user identifier, identifying profile information associated with the user identifier, the profile information comprising explicit constraints and implicit constraints applicable to generation of the on-demand personalized news program, and applying a program module to select content for the on-demand personalized news program, the program module using the explicit constraints, the implicit constraints, and metadata associated with editorial curation of the content. The method also includes generating the on-demand personalized news program using the program module, and transmitting (e.g., streaming) the on-demand personalized news program in response to the electronic request, the on-demand personalized news program comprising news segments (e.g., individual news stories and advertisement).

The explicit constraints associated with the profile information may include but are not limited to one or more of the following: duration, geographical location, program genre of the news program. The implicit constraints associated with the profile information may include but are not limited to a viewing history of the user associated with the user identifier and user interaction with the on-demand personalized news program.

In one implementation, the method may further include receiving a swipe indication movement associated with an item of the on-demand personalized program, determining an implicit constraint associated with the user which is based at least in part on the swipe indication movement and the item, and storing the implicit constraint in the profile. In another implementation, the swipe indication movement is determined upon a user selecting a different story from a list of upcoming stories. In yet another implementation, the swipe indication movement is determined upon a user selecting different controls (e.g., a button) for switching from the current to the previous or next stories.

In one implementation, the swipe indication movement indicates user feedback concerning viewed content and may form a basis for computing explicit and/or implicit constraints for storage in the profile.

Example implicit constraints stored in the profile may include but are not limited to negative feedback concerning content, percentage of the content viewed, user activity during advertisements, and types of news segments viewed.

Systems, devices, as well as articles that include a machine-readable medium storing machine-readable instructions for implementing the various techniques, are disclosed. Details of various implementations are discussed in greater detail below.

Additional features and advantages will be readily apparent from the following detailed description, the accompanying drawings and the claims.

DETAILED DESCRIPTION

In the following description, reference is made to the accompanying drawings that form a part hereof, and in which is shown by way of illustration specific implementations in which the disclosure may be practiced. It is to be understood that other implementations may be utilized and structural changes may be made without departing from the scope of the present disclosure.

As used herein, the terms "swipe movement" and "swipe indication movement" are used synonymously to describe a swipe motion or gesture made by a user on a multi-point touch screen display of an access device. The motion or gesture can be described as being a vertically upward and/or vertically downward movement, or horizontally leftward or horizontally rightward movement. The motion or gesture need not be exactly vertical or horizontal; a substantially vertical or horizontal motion or gesture is referred to as a swipe movement. The terms "story", "news content", "news segment" and "package" are used synonymously in the disclosure to describe individual stories forming a video news program.

Figure 1:
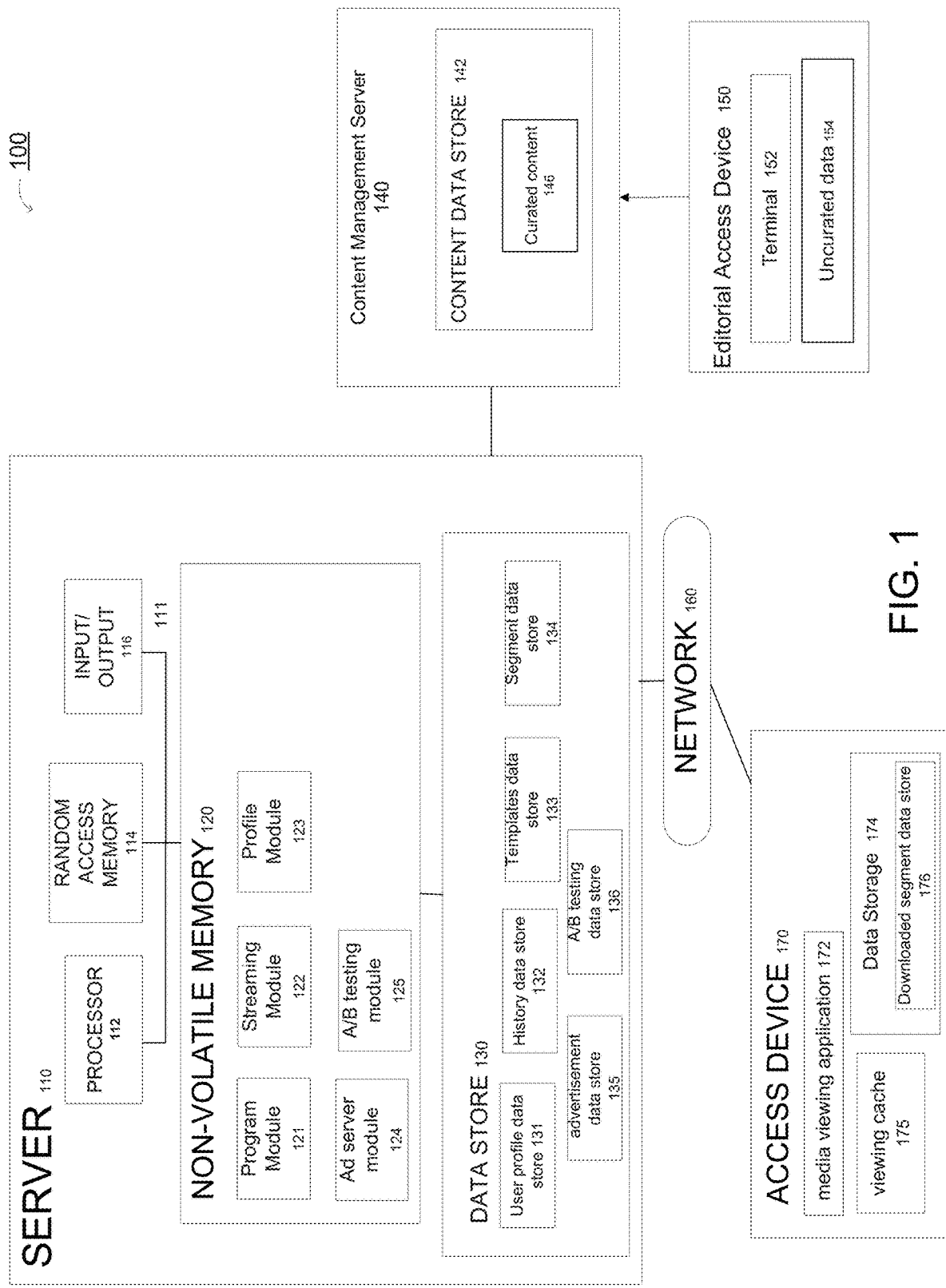
FIG. 1 is an exemplary architectural diagram of the system.

FIG. 1 shows an exemplary system 100 for providing an on-demand personalized news program. As shown in FIG. 1, in one implementation, the system 100 is configured to include an access device 170 that is in communication with a server 110 over a network 160. Access device 170 can include a personal computer, laptop computer, or other type of electronic device, such as a mobile phone, smart phone, tablet, PDA or PDA phone. In one implementation, for example, the access device 170 is coupled to I/O devices (not shown) that include a keyboard in combination with a point device such as a mouse for sending an on-demand personalized news program request to the server 110. Preferably, memory (not shown) of the access device 170 is configured to include a media viewing application 172 that is used to request and receive information from server 110. Communication between the media viewing application 172 of the access device 170 and server 110 may utilize one or more networking protocols, which may include HTTP, HTTPS, RTSP, or RTMP. In one implementation, media viewing application 172 is configured to access a viewing cache 175 and a data storage 174, which may include a downloaded segment data store 176 for storage of a downloaded on-demand personalized news program. Although one access device 170 is shown in FIG. 1, the system 100 can support one or multiple access devices.

The network 160 can include various devices such as routers, servers, and switching elements connected in an Intranet, Extranet or Internet configuration. In some implementations, the network 160 uses wired communications to transfer information between the access device 170 and server 110. In another implementation, the network 160 employs wireless communication protocols. In yet other implementations, the network 160 employs a combination of wired and wireless technologies.

As shown in FIG. 1, in one implementation, the server device 110, may be a special purpose server, and preferably includes a processor 112, such as a central processing unit ('CPU'), random access memory ('RAM') 114, input-output devices 116, such as a display device (not shown), and non-volatile memory 120, all of which are interconnect via a common bus 111 and controlled by the processor 112.

In one implementation, as shown in the FIG. 1 example, the non-volatile memory 120 is configured to include a program module 121 for generating the personalized news program. Various considerations are accounted for when assembling the personalized news program, examples of which are, but not limited to the user's geographical location, program duration choice, the user's viewing history, and editorial curation. Further details of personalization are discussed in connection with profile module 123.

As shown in FIG. 1, the non-volatile memory 120 also includes a streaming module 122 for transmitting the news program to the user. In one implementation, transmitting the news program comprises streaming one or more packages or advertisements to the access device 170.

The non-volatile memory 120 is also configured to include a profile module 123 for identifying users and storing user characteristics. Example user characteristics include but are not limited to, identification of the user with a "user identifier", programs viewed by the user forming a "viewing history", stories viewed by the user represented by "story history", including percentage of the stories viewed, and the manner by which a news program was viewed described as "viewing behavior" (e.g. a preference in viewing the news program in portrait or landscape mode).

In one implementation, user characteristics may be represented as user constraints and may include explicit constraints and implicit constraints. Explicit constraints may be but are not limited to, user preferences relating to program duration (e.g. twenty (20) minute program), geographic relevance (e.g., US or UK: countries or broader geographic regions for which a program is produced; US East or US West: narrower geographic regions for which certain content is relevant; or more granular, localized content relevant to a particular city or neighborhood) and program genre (e.g., general interest news; business-focused programming).

Implicit user constraints include but are not limited to the before-mentioned viewing history, story history and viewing behavior. In one implementation, using the viewing history and story history, the program module 121 inhibits the inclusion of a previously viewed story into the news program. In another implementation, for example, if a previously viewed story has been updated, the program module 121 selects the updated news story for inclusion in the news program.

The program module 121 may also utilize the viewing history and story history to determine the user's viewing preferences. For example, in one implementation, the program module 121 may analyze editorial categorization, program section, story topic, geographical relevance for the story, story mood (e.g., neutral, lighthearted, or somber), story format (e.g., interview, voiceover, reporter on camera), percentage of story viewed, and the version of the story viewed (stories are created in different lengths, known as edit lengths) to determine negative feedback and positive feedback associated with the stories.

Exemplary negative feedback may include but is not limited to a user skipping or otherwise not viewing to completion one or more stories of a certain genre or topic more than others. In one implementation, the program module 121 weights a story skipped earlier in the news program more negatively than skipping the story later in the news program. Additionally, the program module 121 may compare the story skips against the overall popularity of the story and determine that if it is a generally unpopular story, an individual user skipping it may not indicate the user's negative preference for one of the story's characteristics (e.g. political news). Story characteristics are further described in connection with a Content Management Server 140.

Exemplary positive feedback may include but is not limited to a user consistently viewing stories with particular characteristics in their entirety or sharing such stories with other users. In one implementation, the program module 121 weights such stories higher than other stories as users are more likely to enjoy and prefer those types of stories. Additionally, the program module 121 compares a story viewed to completion against the story's overall popularity and determines that if it is a generally popular story, an individual user viewing such story to completion may not indicate positive feedback.

In one implementation, the program module 121 correlates the positive and negative feedback with relationships between story characteristics. For example, a user who views political stories regardless of the edit length of a story may prefer longer edits of political news. In another example, a user who fully views entertainment stories with a short edit length but skips longer entertainment stories toward the middle of the news program may prefer shorter edits of entertainment news.

By analyzing explicit and implicit constraints, the program module 121 generates a customized news program based on user viewing preferences. User usage data associated with program viewings are stored into user profile data store 131.

The program module 121 may also determine viewing behavior from the mixing and pacing of varied length stories in a news program. In one implementation, the program module 121 correlates the sequence of varied length stories in a program with the frequency of stories skipped by the user as the program progresses to determine the user's preference for story pacing. For example, a user who frequently skips stories in the first half of the news program may prefer to see more but shorter editorial versions of those news stories instead.

Another exemplary characteristic of program viewing behavior may include but is not limited to the user interaction with advertising incorporated by the program module 121 into the news program. In one implementation, for example, the program module 121 analyzes the user's attempts to skip ads during the news program and measures the user's tolerance for the amount of advertising (also referred to as "ad load") and the presentation of advertisements (e.g., number of stories between ad breaks; number of advertisements per break). The program module 121 may request from Ad server module 124 and A/B testing module 125 an experimental presentation for the user containing different advertisement presentation styles. The program module 121 then incorporates the user's behavior when presented with the advertisements (e.g., ad response rates and user skip attempts) in its determination of a presentation style most palatable to the user. Further details of advertisement and experimental presentation are discussed in connection to Ad server module 124 and A/B testing module 125.

A further exemplary characteristic of program viewing behavior may include but is not limited to section ordering and sizing. In one implementation, the news program is organized into sections such as "Top News", "National", "World", "Business", and "Culture". The program module 121 then analyzes the user's skipping behavior during individual sections. The program module 121 may also request from A/B testing module 125 an experimental presentation containing different section ordering in the news program. The program module 121 then incorporates the user's program viewing behavior when presented with the different section ordering (e.g., skip rates) to determine an ordering that the user prefers. Additionally, the number of stories in a section may be increased by the program module 121 when a user tends to watch all stories in the section. However, the number of stories in a section may be decreased by the program module 121 when a user tends to start skipping stories toward the end of the section.

As shown in the FIG. 1 example, the non-volatile memory 120 further includes an ad server module 124 that may control the presentation of advertisements in the on-demand personalized news program. Exemplary presentation of advertisements may also include but are not limited to the number of advertisements per advertisement break or duration of an advertisement. In one implementation, the ad server module 124 may control and limit the audio volume of an advertisement to maintain the fluidity of the news program.

The non-volatile memory 120 may further include an A/B module 125 for which different versions of a news program (e.g., different section ordering, etc.) are presented to the user and then monitored for the manner by which the user interacts with the content. Alternatively, different edit lengths of the same story are presented to the user. In one implementation, different ad presentation styles are presented to the user. For example, as disclosed in related U.S. patent application Ser. No. 14/478,131, which is incorporated by reference herein, the 'attractiveness' or conversion rate of a news segment may be inferred. The A/B module 125 may then store the attractiveness or conversion rate of the news segment into the user profile data store 131. Using the A/B module 125 analysis of the user interaction can assist the owner/developer/designer/marketer determine which version of the news programming is more effective.

In one implementation, as shown in FIG. 1, the Content Management Server 140 includes a processor (not shown), random access memory (not shown) and non-volatile memory (not shown) which are interconnected via a common bus and controlled by the processor. The Content Management Server 140 is responsible for enabling editorial staff to add, delete, modify, and curate video content that may form the basis of a news program to be distributed. In one implementation, the content management server 140 also maintains a hierarchy of content categories and topics available to the program module 121, manages user accounts and subscriptions to content, and provides content to streaming module 122 for delivery of the news program to users. The Content Management Server 140 is network accessible and is configured to receive and process curated news stories that have metadata associated with editorial curation. The curated news stories are stored as curated content 146 and are accessible via the content data store 142. The metadata associated with editorial curation describe the story's characteristics and relationship to other current stories, examples of which may include but are not limited to slug, language, published date/timeline, updated date/time, headline, byline, dateline, caption/description, editorial comments, categories or topics, transcription, duration, production region, production format, editorial priority, story mood or tone, and story expiration time/time to live. In another implementation, Content Management Server 140 stores metadata and a pointer to the curated content. In an alternative implementation, the Content Management Server 140 stores actual uncurated data. In yet another implementation, Content Management Server 140 assembles the personalized programs based on the user's location, program duration choice, the user's viewing history, and editorial curation, functioning in a similar manner to the program module 121 discussed above.

In one implementation, the Content Management Server 140 is configured to communicate directly with the server 110 and the information determined by the Content Management Server 140 is utilized by one or more software modules 121, 122, 123, 124, 125. In another implementation, the Content Management Server 140 is included in the nonvolatile memory 120 of server 110. In yet another implementation, the Content Management Server 140 communicates with the server 110 over the network 160.

In the implementation shown in FIG. 1, the editorial access device 150 communicates directly with the Content Management Server 140. The Editorial Access Device 150 obtains uncurated data 154, which are stories in a raw unedited format and is used to perform editorial curation on the stories and add the before-mentioned metadata information. Once the stories are curated, the stories are stored as curated content 146. In one implementation, uncurated data 154 is stored locally on the Editoral Access Device 150. In another implementation, uncurated data 154 is stored on an external database.

As shown in the exemplary FIG. 1, a data store 130 is provided that is utilized by one or more of the programming modules 121, 122, 123, 124, 125 to access and store information relating to the on-demand personalized news program. In one implementation, the data store 130 is a relational database. In another implementation, the data store 130 is a file server. In yet another implementation, the data store 130 is a configured area in the non-volatile memory 120 of server 110. Although the data store 130 shown in FIG. 1 is part of the server 110, it will be appreciated by one skilled in the art that the data store 130 can be distributed across various servers and be accessible to the server 110 over the network 160. As shown in FIG. 1, in one implementation, the data store 130 is configured to include a user profile data store 131, history data store 132, templates data store 133, segment data store 134, advertisement data store 135, and A/B testing data store 136.

The user profile data store 131 includes information relating to the user. For example, in one implementation, the user profile data store 132 includes user information such as a name, account information (e.g., premium account designation), user preferences and the before mentioned implicit and explicit constraints as determined by the program module 121. The user may also grant access to third party social network profile information (e.g., age, gender, hometown, interests, educational background, etc.) when associating a third party social network with their user profile (e.g., Reuters TV profile).

The history data store 134 includes information relating to the user's viewing history and story history as described in relation to the program module 121 discussed above.

The template data store 133 includes default program templates for a new user with no saved profile history. Each default template may be a composite of general interest news, top stories, national stories, long and short stories, and advertisement breaks which may be curated by the Editorial Access Device 150 and generated by the content management server 140 based on curated content 146. The programming module 121 may utilize the templates data store 133 for new users with no established profile to generate a news program.

The segment data store 134 includes information relating to content of the news program. For example, in one implementation, the segment data store 134 includes the news program generated by the program module 121 to be transmitted by streaming module 122. The transmitted content may include program-related metadata, such as information describing time intervals associated with a varied length news program inserted by program module 121.

User viewing preference and history metadata may be obtained though sensors of the access device. Exemplary sensors include but are not limited to, audio inputs (such as a microphone), image/video inputs (such as its or camera(s)), light sensor, accelerometer, biometric sensors (such as a fingerprint scanner), environmental sensors (such as pressure, temperature and humidity sensors), gyroscopes, magnetometers, touch screen sensors, network position sensors (GPS, Wi-Fi, Bluetooth, GSM/CDMA) and proximity sensors.

In one implementation, the streaming module 121 uses program-related metadata and timeline metadata based on time intervals. These metadata, along with user viewing preference and history metadata, allow the media viewing application 172 to present the program in a manner consistent with the user's preferences and inputs. For example, specific sections of content may be accessed using the metadata in response to user interaction with the graphical user interface (GUI) detected by program module 121.

The advertisement data store 135 contains a collection of advertisements to be used by the program module 121 to be incorporated into the news program. In one implementation, the program module 121 selects advertisements randomly for inclusion. In another implementation, the program module 121 selects advertisements based on specific characteristics of the news program or the user including, but not limited to: metadata in the user profile data store 131; category/top, format, or mood of the content adjacent to the advertisement break; program section in which the advertisement break is presented; manufacturer, model, and capabilities of the access device 170; data obtained through sensors of the access device including, but not limited to, audio inputs, image/video inputs, light sensor, accelerometer, biometric sensors, environmental sensors, gyroscopes, magnetometers, touch screen sensors, network position sensors, and proximity sensors; and associations between data obtained through sensors of the access device and external data sources, such as the current weather in a particular location obtained via the access device's GPS. Additionally, delivery controls may be taken into account when selecting advertisements for inclusion, including but not limited to frequency capping/session limiting, industry exclusions based on one advertiser's proximity to another, campaign pacing/burn-rate management, and value of the advertisement relative to other available advertisements.

The A/B testing data store 136 includes different versions of the news program to present to the user. For example, in one implementation, the version of the news program is based on the type of access device 170.

It should be noted that the system 100 shown in FIG. 1 is one implementation of the disclosure. Other system implementations of the disclosure may include additional structures that are not shown, such as secondary storage and additional computational devices. In addition, various other implementations of the disclosure include fewer structures than those shown in FIG. 1.

Figure 2:
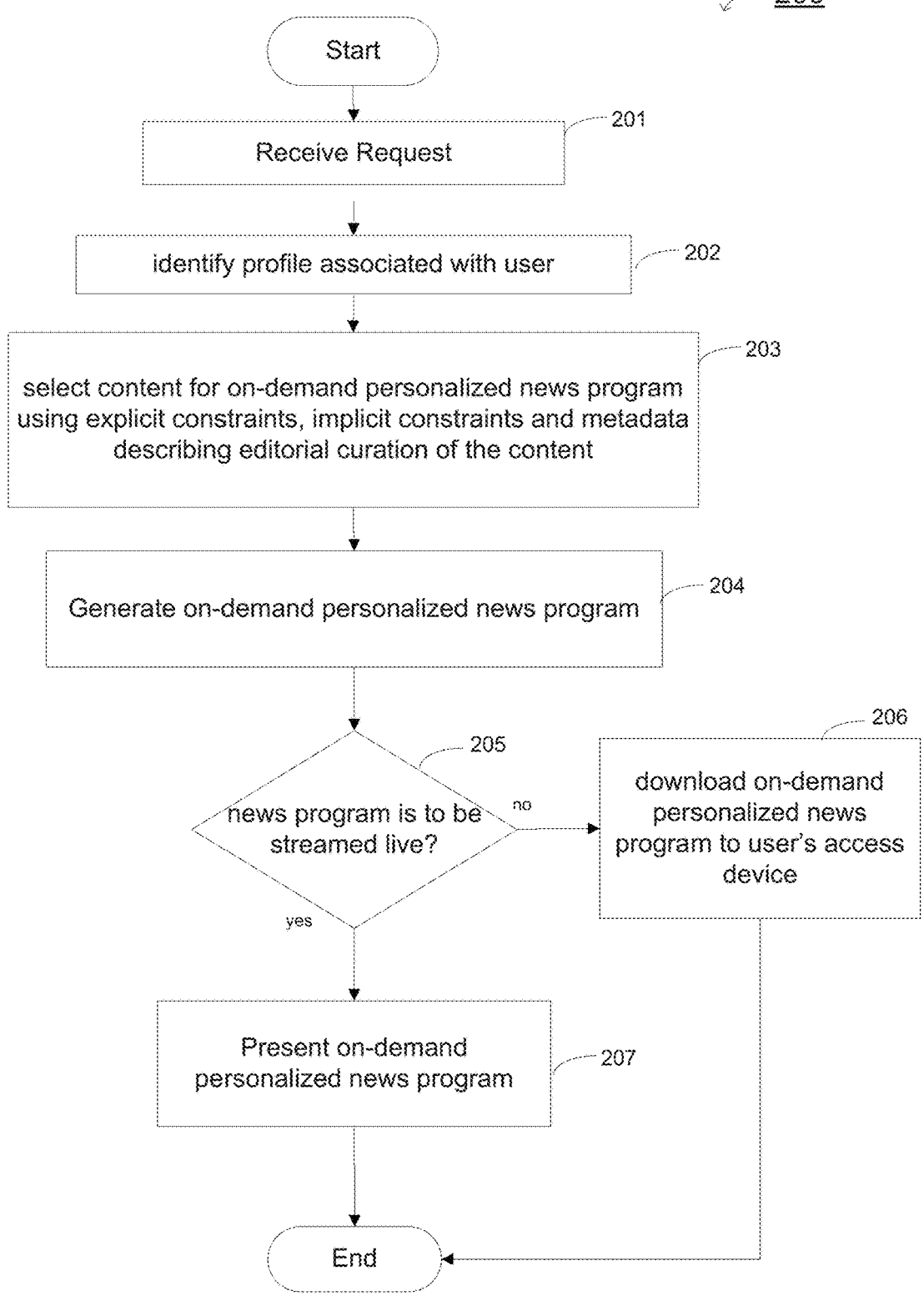
FIG. 2 is an exemplary flow chart of one implementation of the disclosure.

Referring now to FIG. 2, an exemplary method 200 of generating an on-demand personalized news program is discussed. As shown in the FIG. 2, at step 201, an electronic request for an on-demand personalized news program is received. In one implementation, the request is transmitted to the program module 121 in response to a user's request via media viewing application 172.

Next, at step 202, upon receiving the request, the program module 121 invokes the profile module 123 to identify the profile associated with the user. The profile module 123 then determines if there is an established profile for the user stored in the user profile data store 131. If a profile has not yet been established for the user in the profile data store 131, the profile module 123 communicates such a finding to the program module 121, and the program module 121 obtains a default program from templates data store 133 to generate a news programming for the user. If there is an established profile, the program module 121 transmits a request to the profile module 123 to access implicit and explicit constraints associated with the user from user profile data store 131. The program module 121 also communicates with the content management server 140 to obtain curated content 146.

User constraints may be weighted either explicitly by the user's designation or implicitly by the user's behavior. In one implementation, the program module 121 is adapted to override the explicit and or implicit constraints associated with the user based on editorial curation.

Next, once constraints are determined, at step 203, the program module 121 selects content for the news program based on the explicit and implicit constraints of the user, and metadata associated with the curated content 146. For example, in one implementation, the program module 121 uses constraints as input to a multidimensional knapsack problem (MKP). Each of the user's explicit and implicit constraints, as well as metadata associated with the curated content, are used as knapsack constraints in approaches for both resolving and approximating solutions to the MKP. In another implementation, the program module 121 uses a greedy algorithm to select content for the news program using the explicit and implicit constraints of the user, and metadata associated with the curated content 146.

The program module 121 then, at step 204, generates the personalized news program based on the selection.

In one implementation, the program module 121 communicates with the ad server module 124 to incorporate advertisements obtained from advertisement data store 135 into the news program. The program module 121 may also communicate with the A/B testing module 125 to incorporate different versions of a news program from NB testing data store 136 or different versions of content from curated content 146 into the news program.

Next, at step 205, the streaming module 122 communicates with the media viewing application 172 on the user's access device to determine if the news program is to be streamed live or be downloaded for viewing at a later time. The download viewing option may be used, for example, to view the news program during a user's commute when their access device 170 does not have connectivity to the server 110.

As shown in FIG. 2, at step 206, if the request is for download, the streaming module communicates with the user's access device 170 and downloads the news program into the downloaded segment data store 176 of the access device 170. If the request is to stream the video live, the streaming module 122, at step 207, streams the video to the media viewing application 172 for display to the user.

Figure 3A:
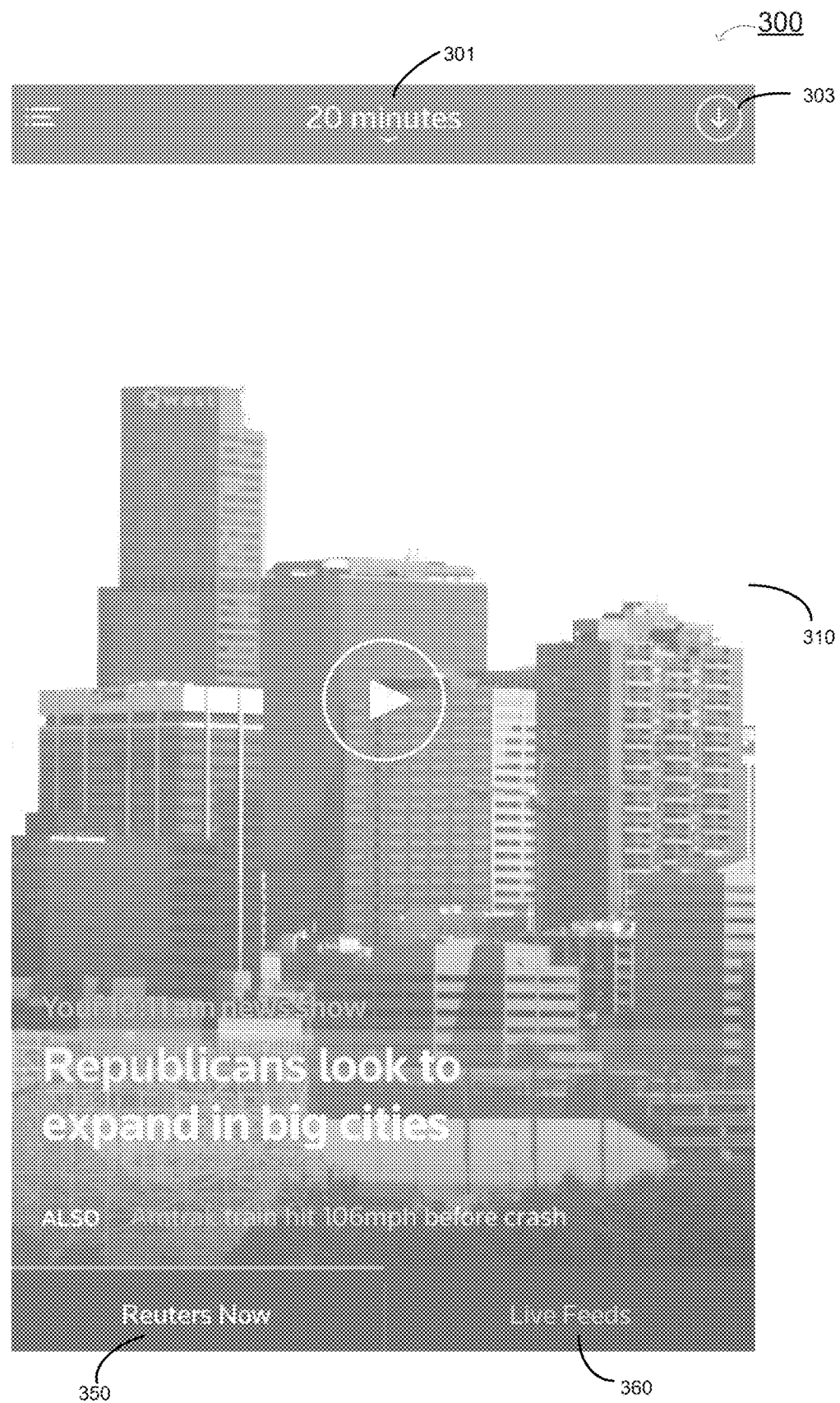
FIG. 3a-3k illustrate prerecorded news content viewable through an exemplary graphical user interface (GUI)

FIGS. 3a-3k illustrate an example of graphical user interface (GUI) provided by a media viewing application 172 for viewing the on demand personalized news program. An example of a media viewing application includes but is not limited to "Reuters TV" provided by Thomson Reuters®. The media viewing application 172 includes a program interface 300 that includes a plurality of tabs and controls the viewing of a prerecorded news program or alternatively a live event. As shown in FIG. 3A, "Reuters Now" tab 350 may be selected to view a personalized news program or a prerecorded news program. A "Live Feeds" tab 360 is also provided and may be selected to view a live video event.

Upon selecting the Reuters Now tab 350, the media viewing application 172 provides a news program duration control 301 that may be selected by the user to set a desired length of a news program. Once selected, duration information is transmitted via the media viewing application 172 to the program module 121 for subsequent storage by the profile module 123. In one implementation, the duration information is stored by the profile module 123 as one of the user's explicit constraint in the user profile data store 131. A download icon 303 is also provided that allows the user to request the generation and/or downloaded news program for subsequent viewing. The downloading request can be initiated by the user manually or be initiated by a rule for automatic downloading of news programs. As shown in FIG. 3A, a media viewing portion 310 is also provided that operates as a viewing area for packages of the news program.

Figure 3B:
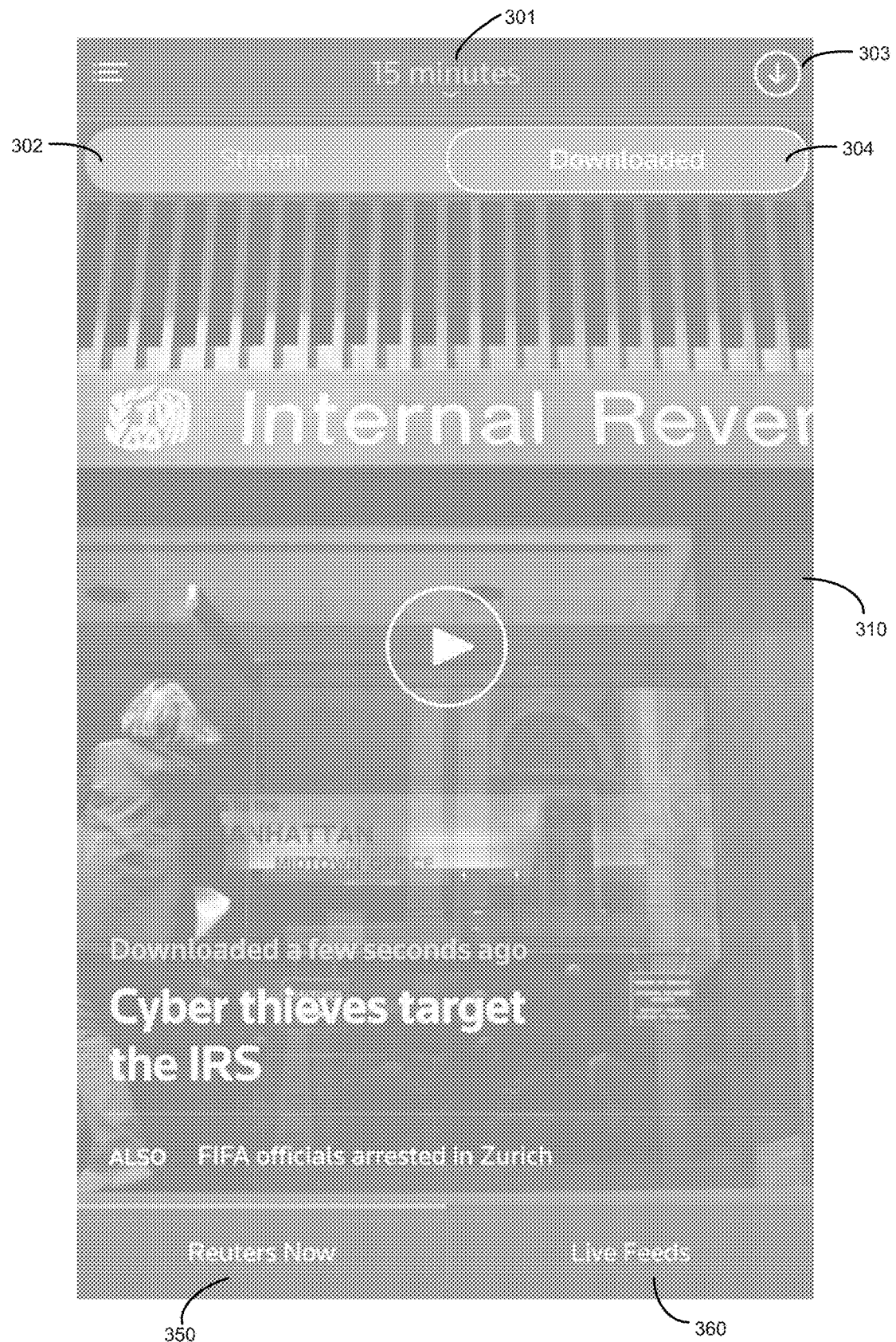

Referring now to FIG. 3b, in one implementation, the media viewing application 172 provides a selectable streaming icon 302 and a selectable downloaded icon 304 for accessing a previously downloaded news program for viewing in media viewing portion 310. In one implementation, the news program is stored in a cache accessible to the access device.

Figure 3C:
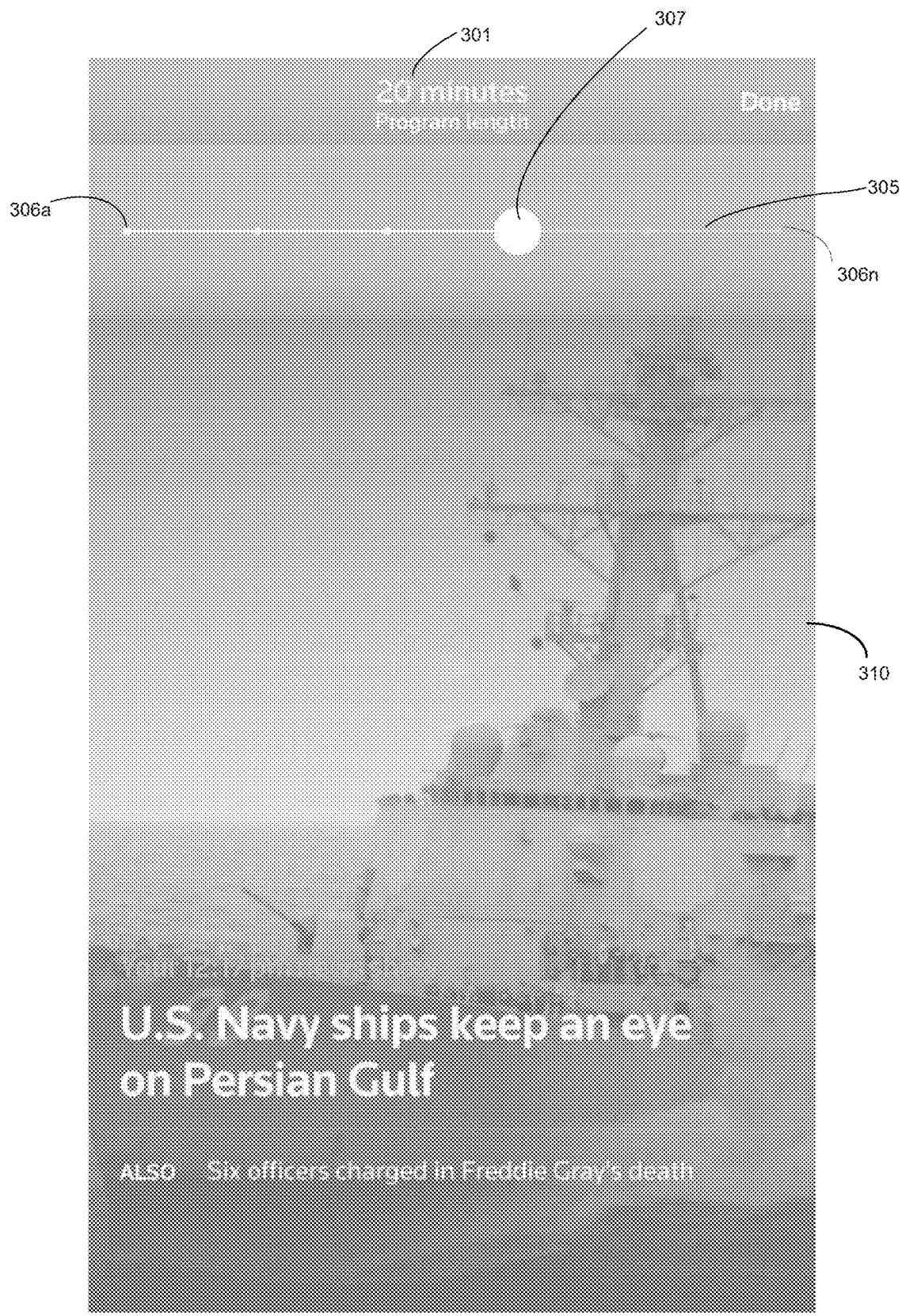

FIG. 3c illustrates a movable control 307 for defining an explicit constraint of the user relating to program duration. In one implementation as shown in FIG. 3C, media viewing application 172 also provides a scale 305 comprising a set of predetermined time intervals 306 $a$-$n$, upon which the movable control 307 operates.

Figure 3D:
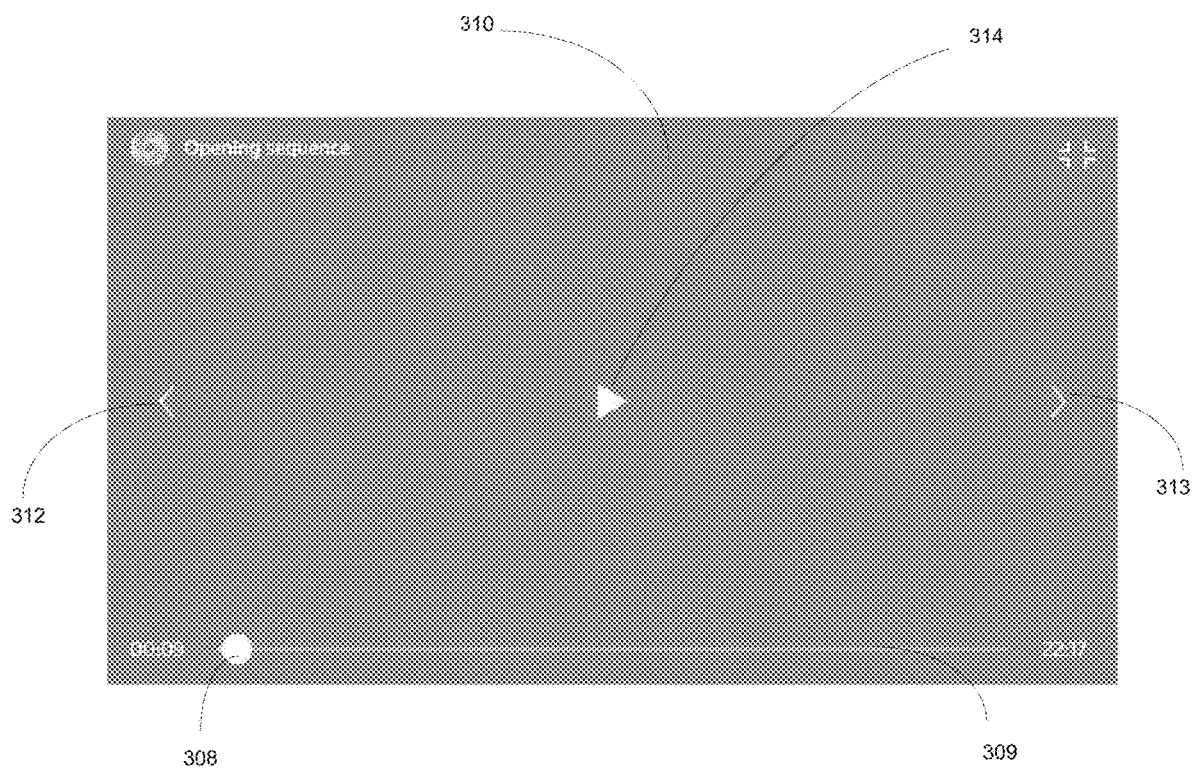

Turning now to FIG. 3d a landscape view of the news program in a full screen mode is shown in the media viewing portion 310. As shown in the FIG. 3D example, in one implementation, the media viewing application 172 provides media controls, or player controls, including graphically depicted sliders, buttons, and/or dials for navigation and information relating to the news program. For example, in one implementation, upon the user tapping the multipoint touch screen of the access device, the media viewing application 172 provides the following media controls: play/pause 314, previous/next package 312, 313, and progress 308 on progress bar 309.

Figure 3E:
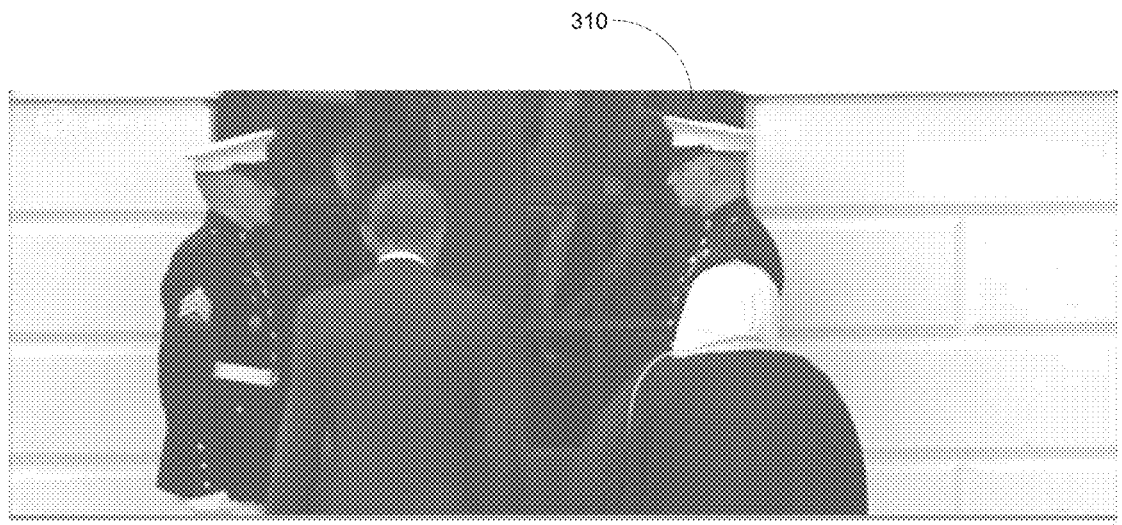
Figure 3E:

In one implementation, referring to FIG. 3e, media viewing application 172 displays caption data 314 obtained from metadata included in the curated content 146. In one implementation, the display of the caption 314 is at the initiation of a news story. As shown in FIG. 3e, the media viewing application 172 also provides a scrolling headline ticker 315 of current events. The duration of caption being displayed may be defined by the metadata of the curated content 146.

Figure 3F:
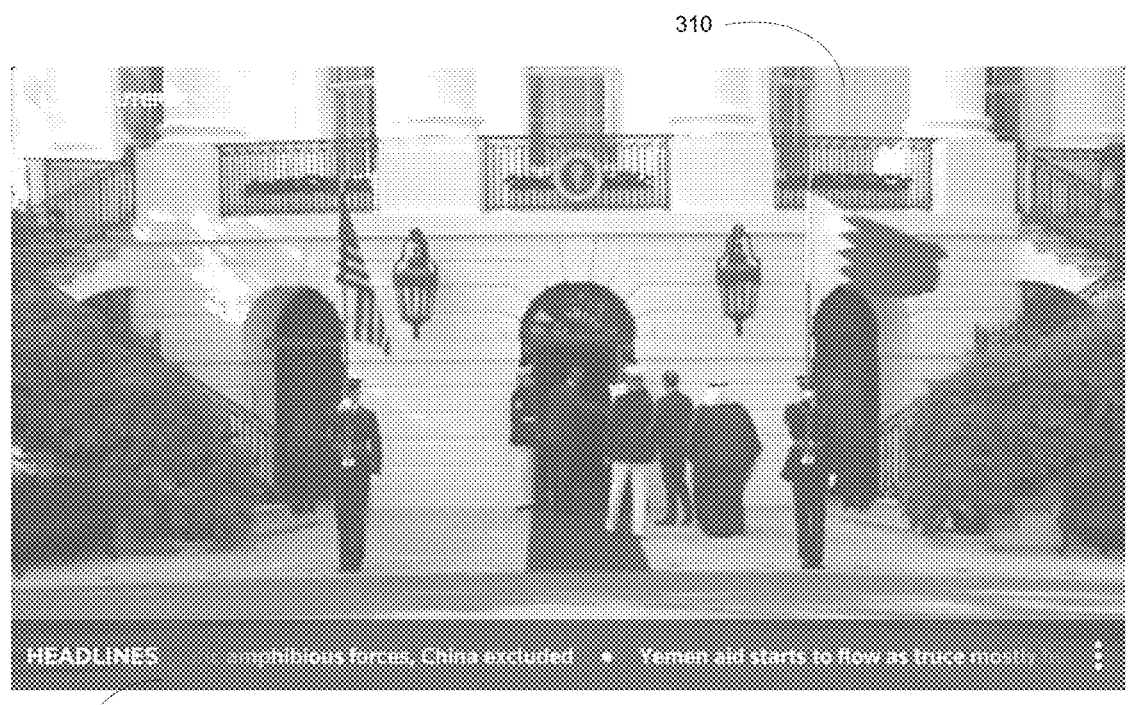

FIG. 3f is an alternative implementation showing only the headline scrolling ticker 315.

In one implementation, the program module 121 inserts program-related metadata regarding the progress viewed and timeline metadata for program duration in the news program. The program module 121 may instruct the media viewing application 172 to store program-related metadata in the viewing cache 175. The user's interaction or touch input on the multi-point touch screen of access device 170 is monitored by media viewing application 172. The user's action to advance or revert to another portion of the news program (i.e. a swiping action on the multi-point touch screen of the access device) triggers the media viewing application 172 to access from the viewing cache 175 the location of a targeted package on the program timeline. In the instance of a live news streamed program, the media viewing application 172 transmits a signal to the streaming module 122 to obtain the package for the desired location on the program timeline. In a downloaded viewing of the news program, media viewing application 172 obtains from the downloaded segment data store 176 the package for the desired location on the program timeline.

Figure 3G:
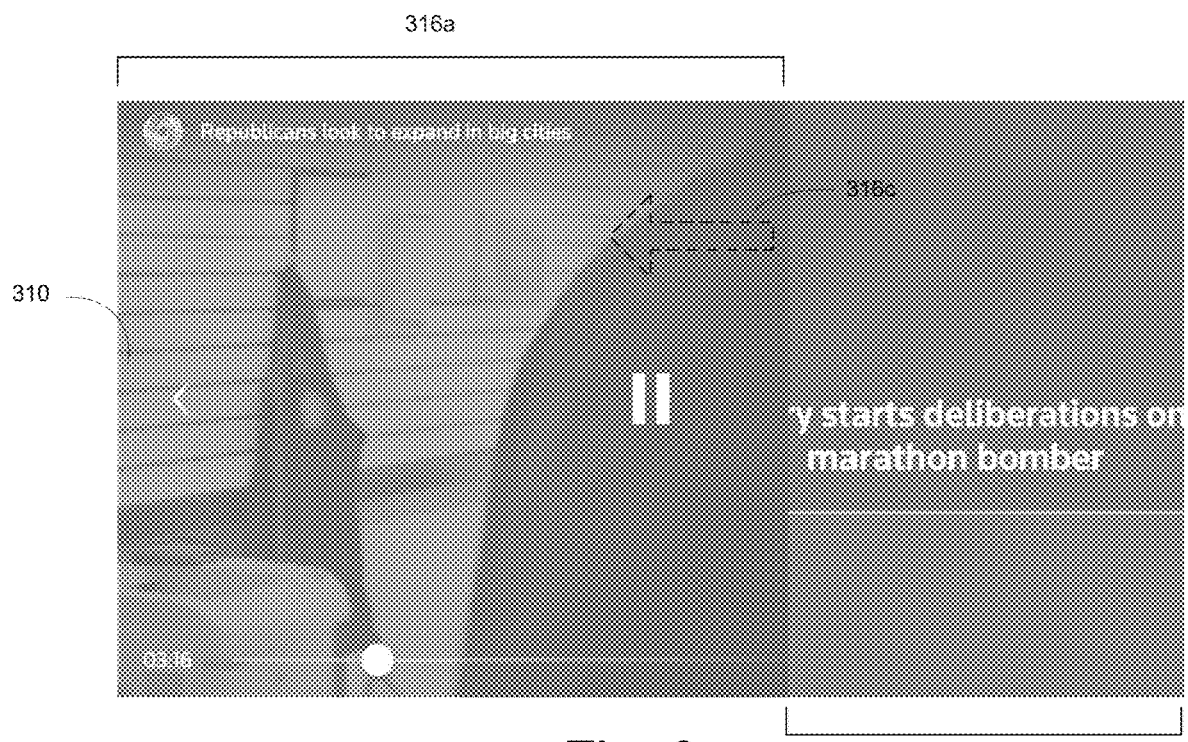

FIG. 3g illustrates an exemplary user interaction on the multi-point touch screen of access device 170 showing the overlay of two different packages (316a and 316b). Upon the swipe movement by the user on the multi-point touch screen, for example a leftward direction 316c, the media viewing application 172 overlays the viewing portion 316a of the currently viewed package with section 316b of the next package. The advancing to the next package of the programmed sequence, by skipping a package, and not completing the currently presented package is stored as an implicit constraint for the user based on user behavior.

Figure 3H:
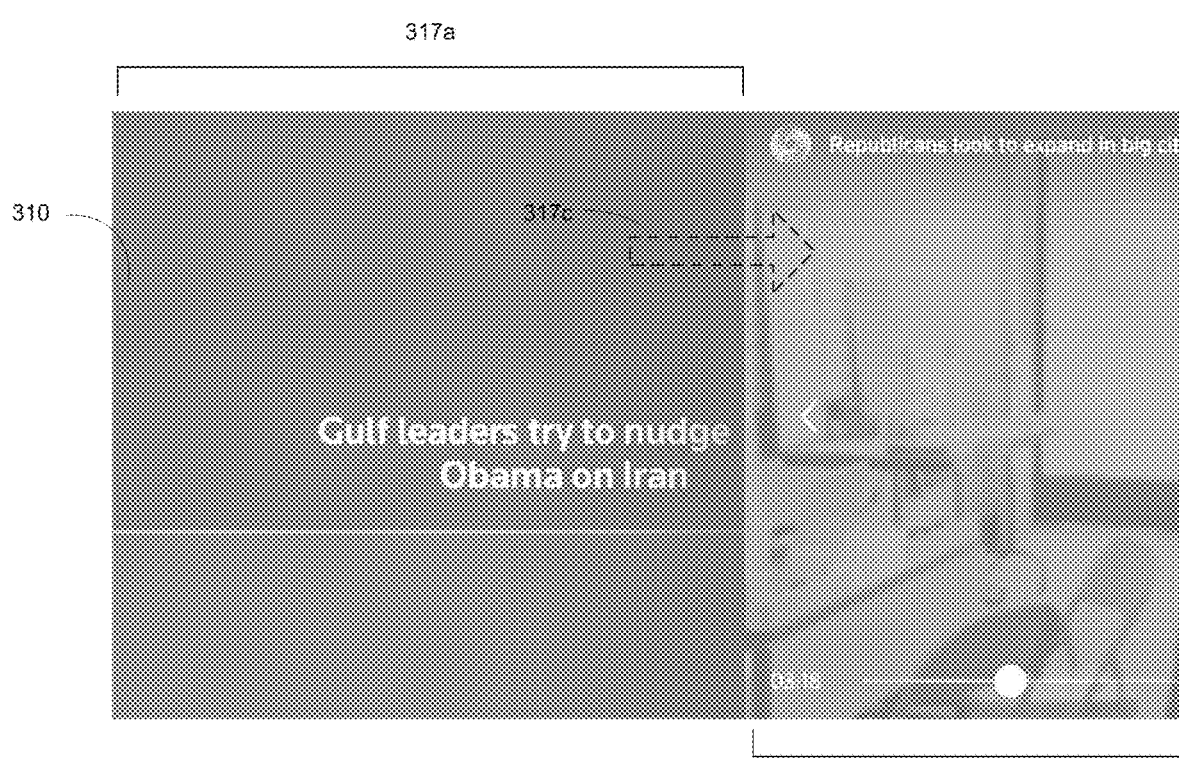

Referring now to FIG. 3h, the overlay of packages due to a swiping in a rightward 317c motion by the user is shown. The viewing portion 317a of the previous package is overlaid onto section 317b of the current package, allowing the user to return to the previous package. The reverting to a previous viewed package may also be stored as an implicit constraint based on the user behavior.

The duration each package is viewed by the user in the above-referenced examples is transmitted by the media viewing application 172 to the profile module 123 for incorporating into one or more of the implicit constraints of the user and then stored into the user profile data store 131. The one or more implicit constraints will be used by program module 121 in generating future news programs.

Figure 3I:
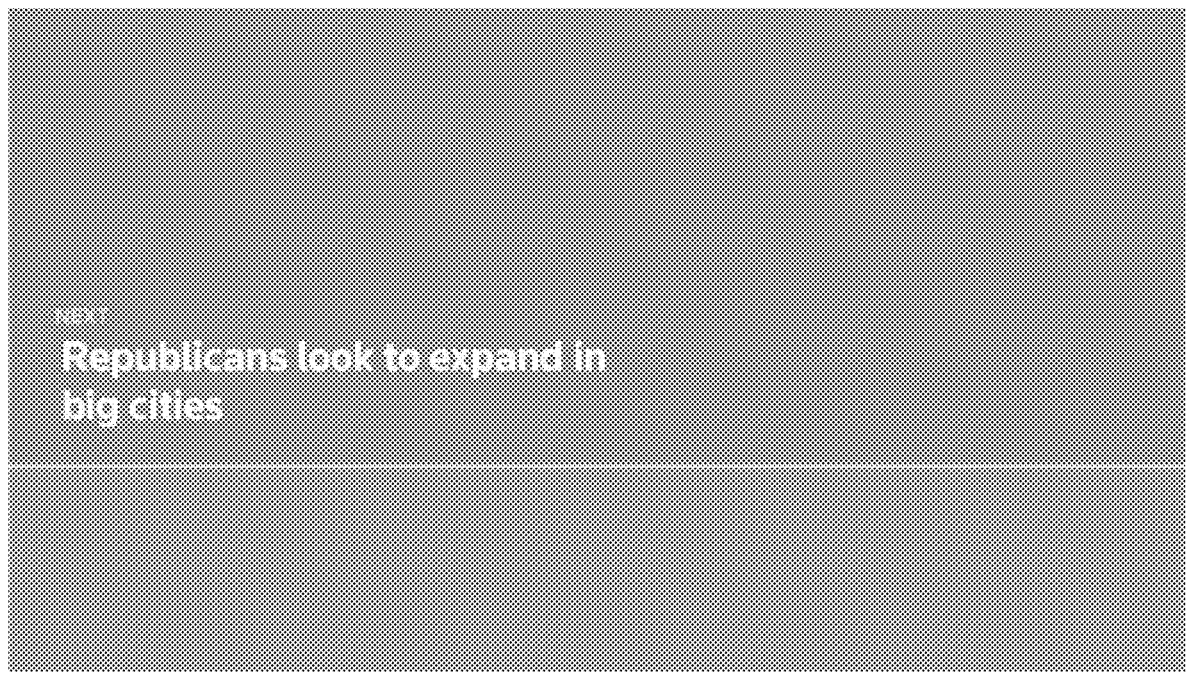

FIG. 3i illustrates an example title screen presented to the user in media viewing application 172 based on metadata accessed from the curated content 146 gathered by program module 121.

Figure 3J:
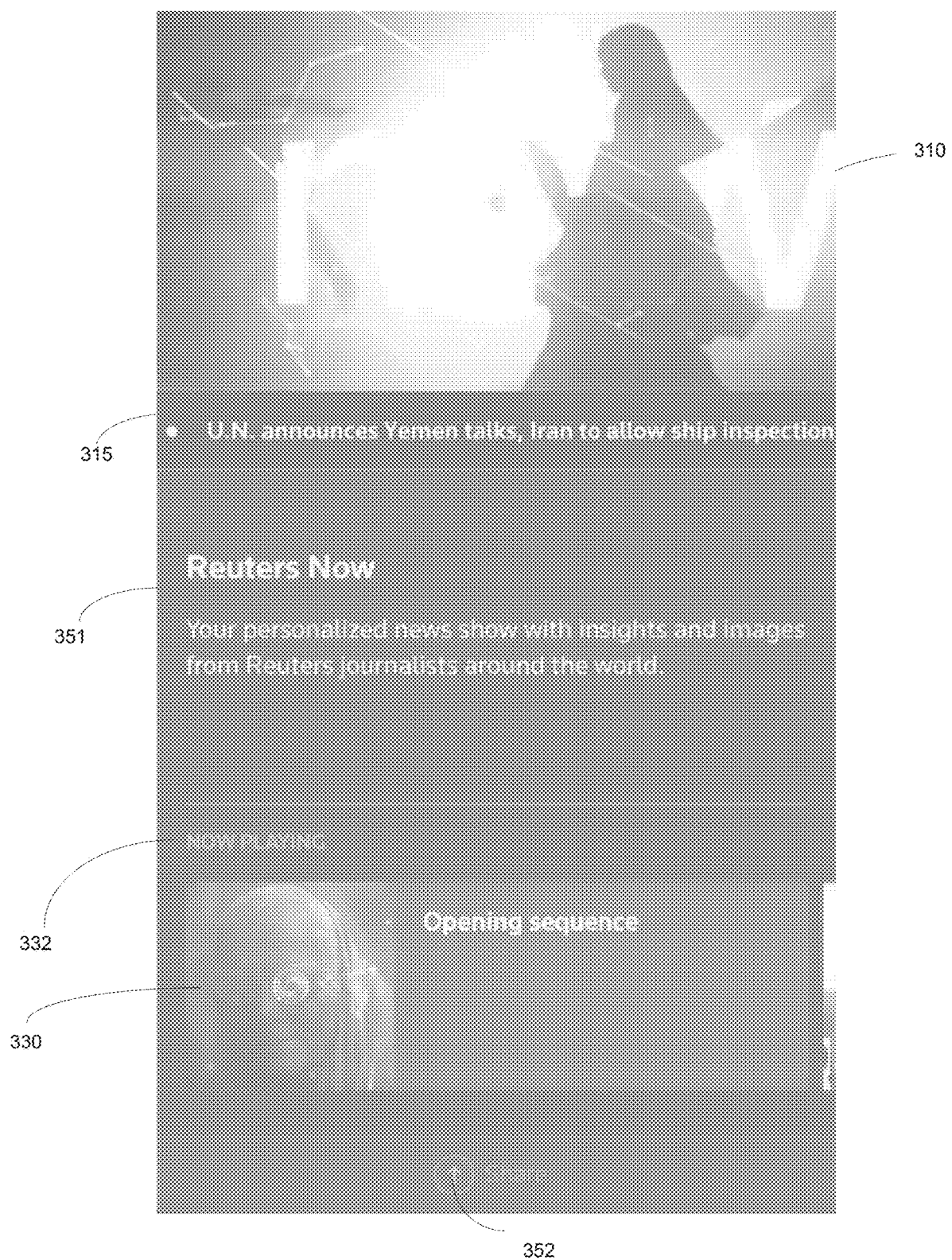
Figure 3K:
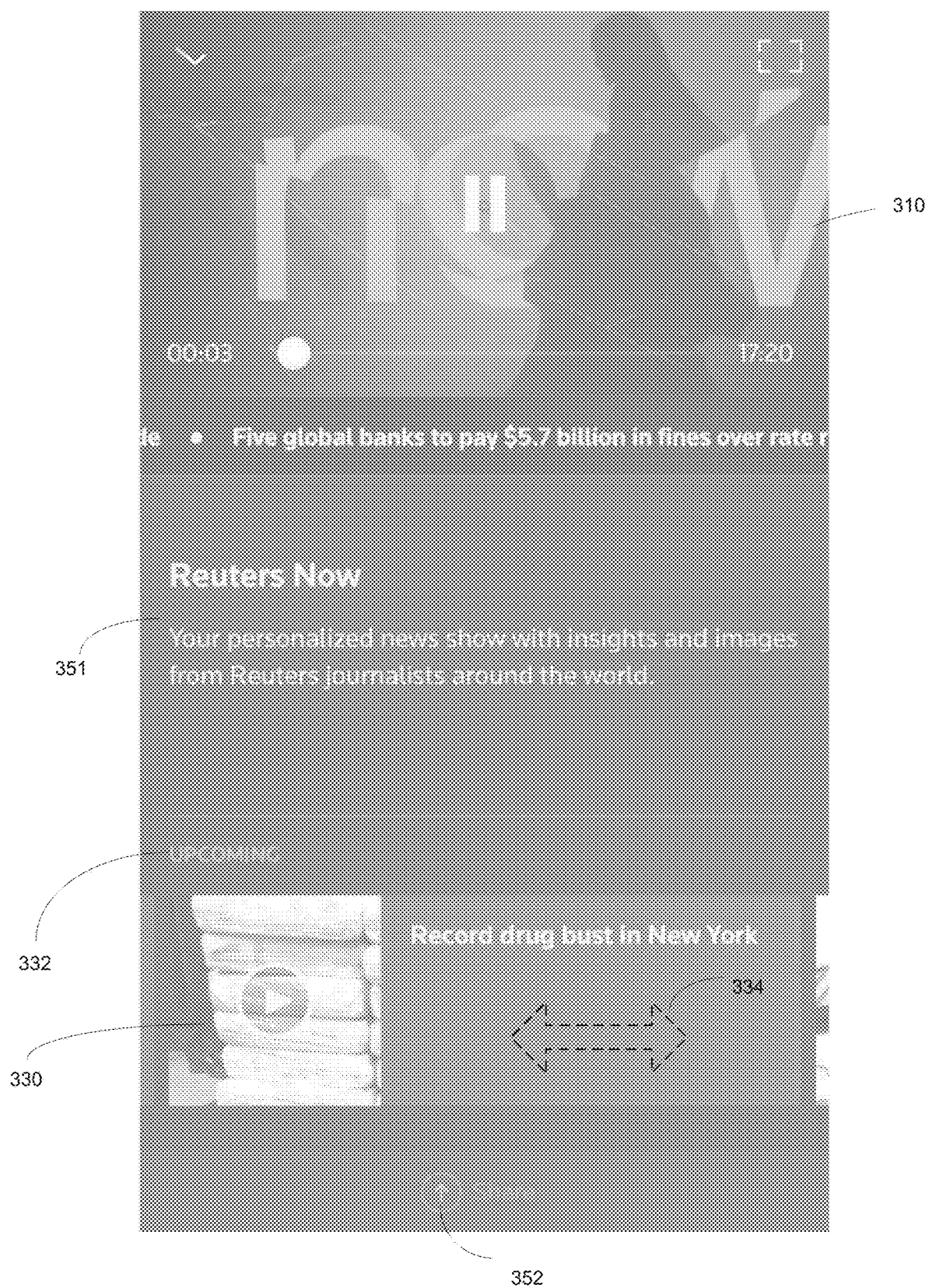

Turning now to FIG. 3j, an example portrait view of the news program is shown in the media viewing portion 310 of the media viewing application 172. As shown in FIG. 3J, in portrait orientation, the media viewing application 172 provides a headline scrolling ticker 315 for display as the news program progresses in media viewing portion 310. Further viewing portions such as a text field 351, a program preview field indicator 332, and preview thumbnails 330 are available in portrait view. In one implementation, the program preview field indicator 332 may depict text indicative of the preview thumbnails 330, for example, package name/headline and duration, "opening sequence", "previous", "now playing", or "upcoming". In a further implementation, the preview thumbnails 330 portion is a scrollable field, as indicated by directional arrows 334 in FIG. 3k, which allows the user to view upcoming packages in the program or browse previously viewed packages. The media viewing application 172 also provides an option for sharing the current package with other users may also be available for selection by the user through a sharing option, in one implementation, depicted as a share icon 352. If a user chooses to share a package, the media viewing application 172 may pause the news program in media video portion 310 until the sharing interaction is complete, at which point, the media viewing application 172 may resume the news program. The media viewing application 172 may communicate the sharing action to the profile module 123 as a positive feedback type of implicit constraint for the user, which may be used in by the program module 121 in future news program generation.

Further examples of generating a news program by program module 121 based on implicit constraints developed through user behavior will now be further explained. In one implementation, the media viewing application 172 detects the skipping behavior based on the user's interaction with the multi-point touch screen. For example, upon skipping of an "entertainment" category package, the behavior is communicated via a signal by the media viewing application 172 to streaming module 122, and the streaming module 122 invokes profile module 123 to store this user behavior as an implicit constraint in the user profile data store 131. A first level of personalization of the news program by the program module 121 may involve selecting shorter versions of entertainment category packages for inclusion in news program. If the user continues to skip entertainment packages, any curated content 146 that has metadata listing "entertainment" as the category may be excluded by the program module 121 in future news programs for that user.

In one implementation, the program module 121 may override the user's implicit and explicit constraints due to program-related editorial. For example, curated content 146 containing metadata describing the category as "top news" may not be eliminated due to personalization and therefore, a "top news" package containing entertainment-related news would still play for a user who otherwise dislikes entertainment news.

In another example of generating a news program by program module 121 based on implicit constraints defined for the user, the history data store 132 may contain information on the frequency of news programs viewed by the user. For instance, if the user views two news programs in quick succession, the profile module 123 may gather viewing information from the history data store 132 to communicate to the program module 121, so that the successive news programs generated by program module 121 contain different content than the previously watched version.

In a further example, if the user has skipped all packages in the news program, whether intentionally or unintentionally, the profile module 123 may not record such a behavior as an implicit constraint.

Figure 4A:
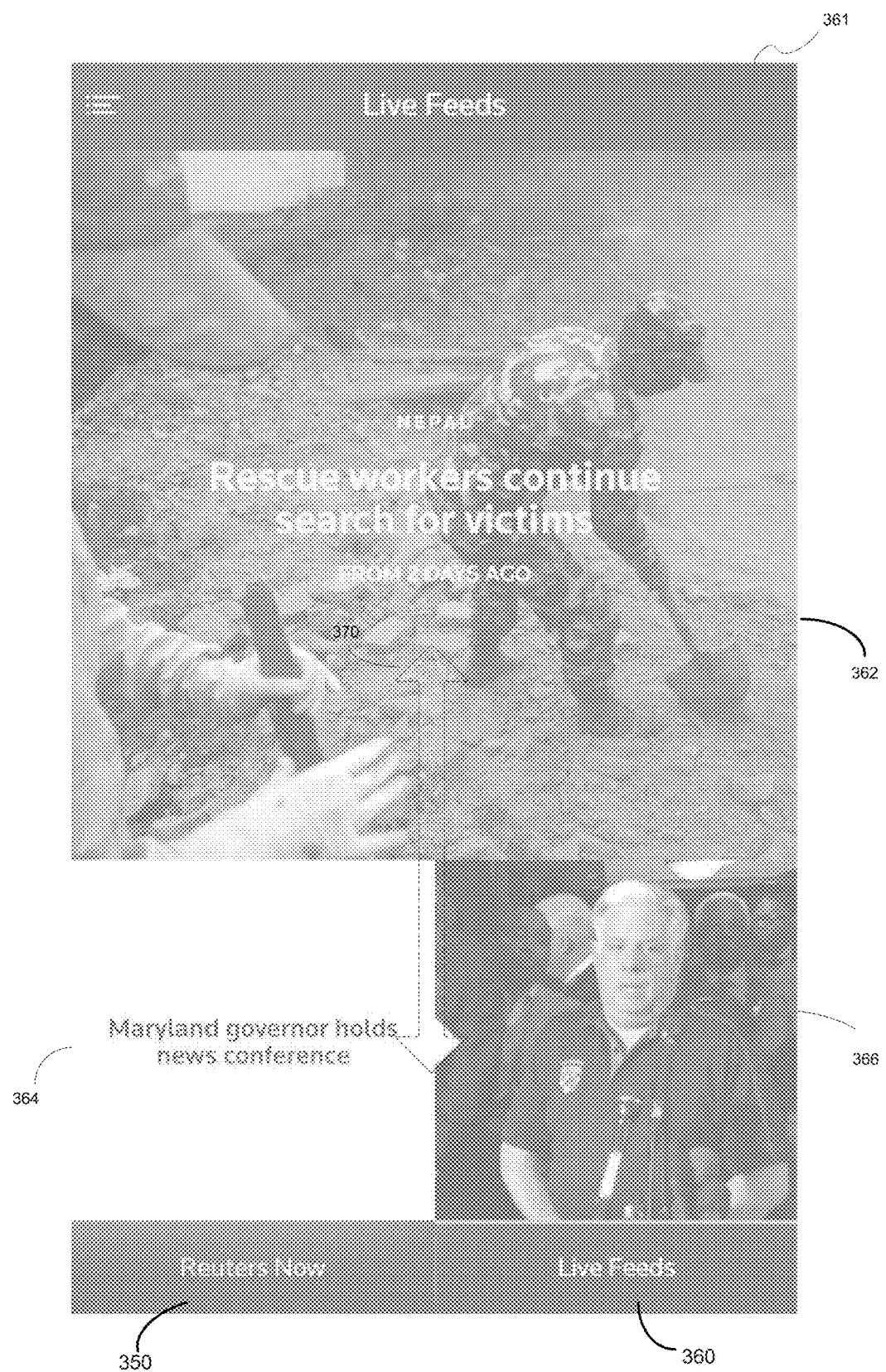
FIG. 4a-4d illustrate streaming live video viewable through an exemplary graphical user interface (GUI).

Now turning to FIG. 4a, an example Live Feed GUI 361 viewable through the media viewing application 172 upon selection of Live Feeds tab 360 is disclosed. As shown in the FIG. 4a example, in one implementation, upon selection of Live Feeds tab 360, the media viewing application 172 provides a plurality of viewing portions 362, 364, 366 for displaying various individual news stories. The various individual news stories are raw unedited live video streams called "Feeds". The first viewing portion 362 shows one of the Feeds available for viewing. The second viewing portion 364 contains text describing the adjacent image in the third viewing portion 366. When the user selects the text or image, the respective Feed is presented to the user, as illustrated in FIG. 4d. A scroll function 370 enables the user to scroll through the viewing portions using vertically upward and/or vertically downward swipe gestures on the multi-point touch screen of the user's access device 170.

Figure 4B:
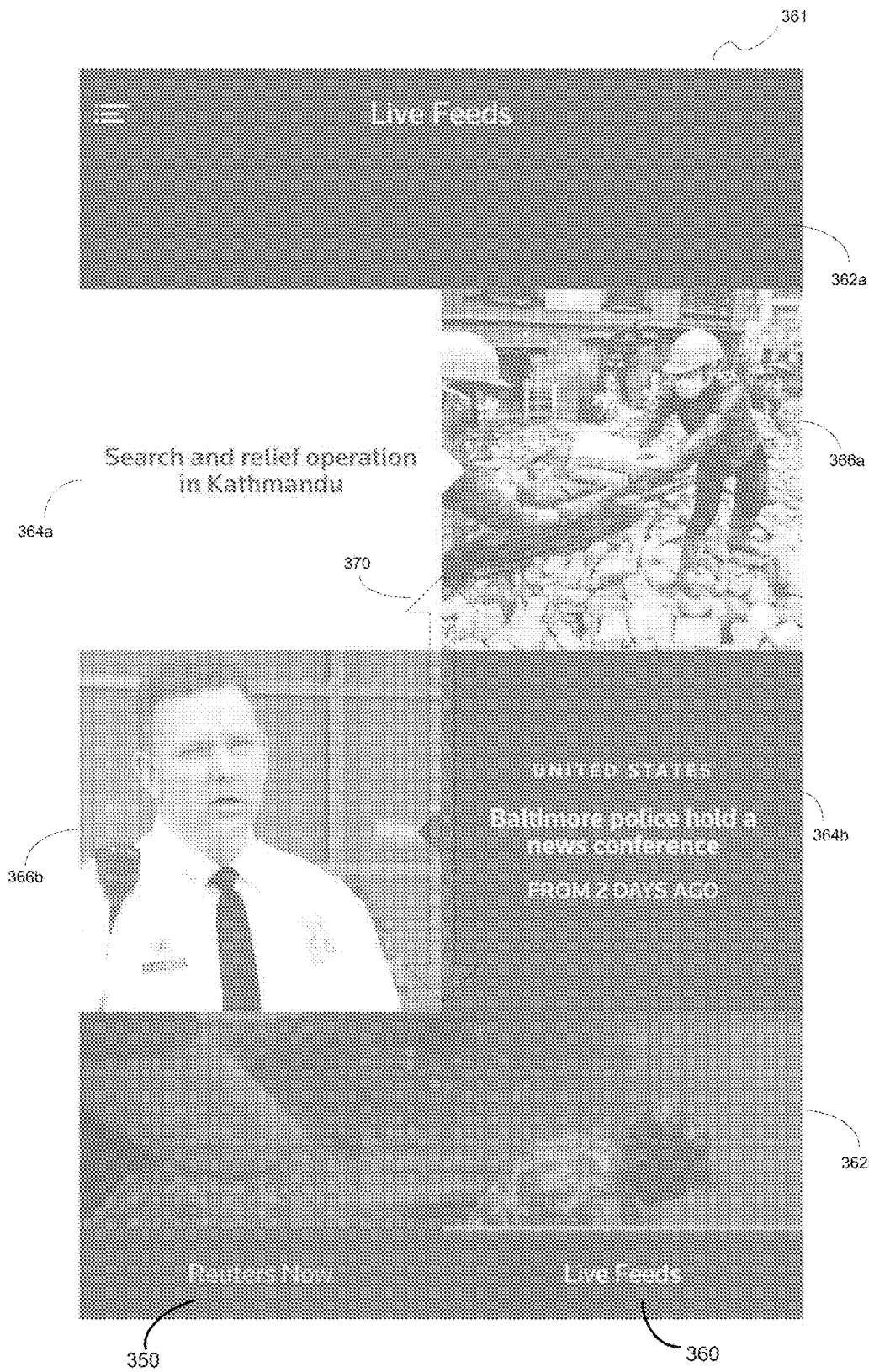

FIG. 4b illustrates another view of Live Feed GUI 361 after the user utilized the scroll function 370. As shown in the FIG. 4b example, viewing portions 362a, 364a, 364b, 366a, 366b depicting text or image relating to the respective Feed available to the user.

Figure 4C:
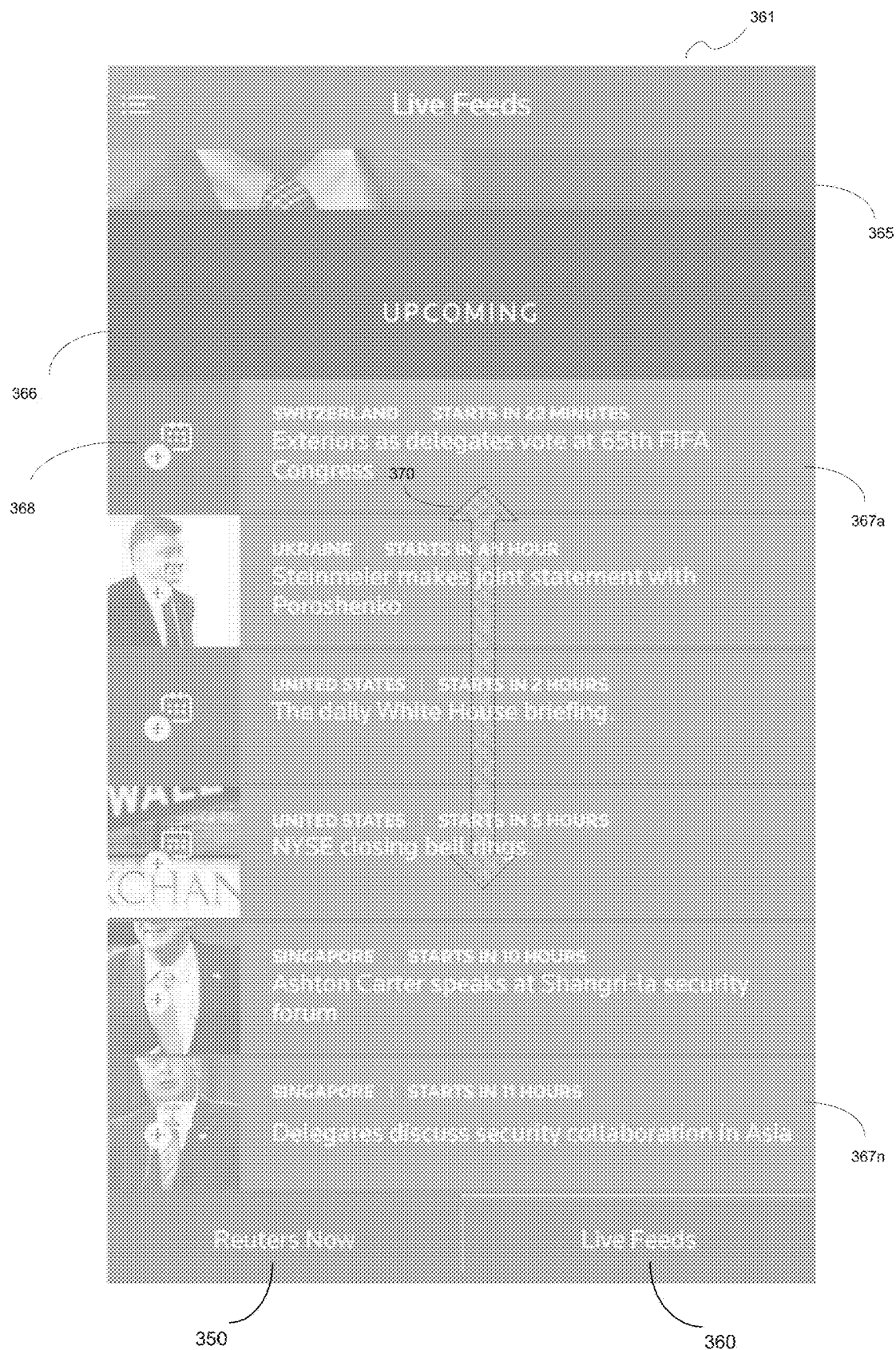
Figure 4D:
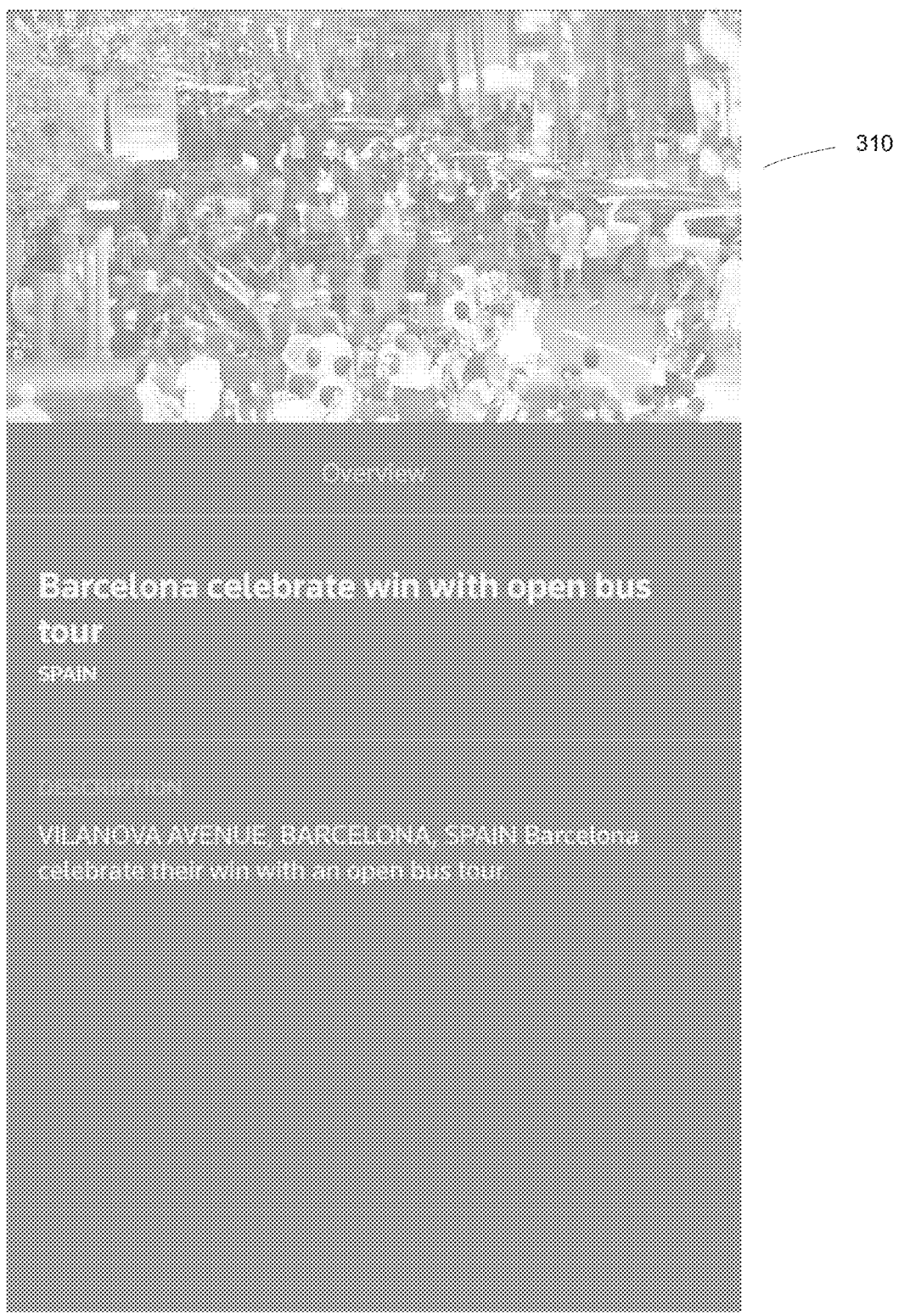

FIG. 4c illustrates a further view of Live Feed GUI 361 upon the user scrolling to the bottom of Live Feed GUI 361 using the scroll function 370 and encounters upcoming feeds portion 366. A listing of upcoming scheduled Feeds is displayed as 367a through 367n with a selectable option 368 for the user to select future feeds to add for later viewing. Live Feed GUI 361 may be displayed in any layout format and may also contain a listing of archived live feeds of past events for user selection.

FIG. 4d is the display screen in portrait view after selecting a video from Live Feed GUI 361, consisting of the media viewing portion 310.

FIGS. 1 through 4d are conceptual illustrations allowing for an explanation of the present disclosure. Various features of the system may be implemented in hardware, software, or a combination of hardware and software. For example, some features of the system may be implemented in one or more computer programs executing on programmable computer. Each program may be implemented in a high level procedural or object-oriented programming language to communicate with a computer system or other machine. Furthermore, each such computer program may be stored on a storage medium such as read-only-memory (ROM) readable by a general or special purpose programmable computer or processor, for configuring and operating the computer to perform the functions described above.

Notably, the figures and examples above are not meant to limit the scope of the present disclosure to a single implementation, as other implementations are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such.

What is claimed is:

1. A system comprising:
a multi-point touch screen;
an on-demand personalized media server having a processor;
memory, and one or more programs, wherein the one or more programs are stored in the memory and configured to be executed by the processor, the one or more programs including instructions for executing a media viewing application that provides personalized on-demand viewing functionality;
while the media viewing application is executing, displaying a Graphical User Interface (GUI) on the multi-point touch screen, the GUI having a first media viewing portion and a plurality of graphically depicted media controls including graphically depicted sliders, buttons, and/or dials;
while the media viewing application is executing, transmitting a request to the on-demand personalized media server to generate an on-demand personalized news program, the request including a user identifier;
while the media viewing application is executing, receiving a content stream from the on-demand personalized media server comprising metadata associated with content, said content stream based on implicit constraints associated with the user identifier and explicit constraints associated with the user identifier, the content stream comprising a plurality of associated news content items to form a personalized news program organized in a plurality of variable duration topical sections, including a first topical section and a second topical section, each of the topical sections comprising a plurality of news content items relating to the topical section; and
while the media viewing application is executing, streaming a first news content item of the plurality of associated news content items through first media viewing portion of the GUI for display on the multi-point touch screen of the computing device,
wherein in response to receiving the request to generate the on-demand personalized news program, cause the processor to:
identify profile information associated with the user identifier, the profile information comprising explicit constraints associated with the user identifier and implicit constraints associated with the user identifier applicable to the generation of the on-demand personalized news program, wherein one of the explicit constraints comprises a duration for the on-demand personalized news program, wherein the implicit constraints comprises a viewing behavior and a story history for the user identifier, the viewing behavior further comprises a correlation between a sequence of varied length news story items viewed by a user for each of the plurality of topical sections associated with the user identifier and a frequency of news story items skipped by the user for each of the plurality of topical sections, the story history further comprising user feedback based on an editorial categorization, a story mood and a story format of each of the varied length news story items;
set characteristics of the on-demand personalized news program including an order and duration for each of the plurality of the topical sections, and a number of news contents for each of the plurality of news content items based on the implicit constraints, and metadata associated with the news content items,
wherein the first topical section is set in the content stream preceding the second topical section a duration of the first topical section is greater than a duration of the second topical section, and a number of news content items in the first topical section is greater than a number of the news content items in the second topical section, all based on a determination that a user associated with the user identifier has a preference for the first topical section over the second topical section;

select content for the on-demand personalized news program for each of the topical sections based on the explicit constraints, the implicit constraints, and metadata associated with the news content, and the characteristics of the on-demand personalized news program, the selected news content sufficient to fill the duration of each of the topical sections and the user defined duration of the on-demand personalized news program;

generate the on-demand personalized news program based on the selected news content, according to the characteristics of the on-demand personalized news program; and transmit the on-demand personalized news program in response to the electronic request.

2. A method comprising:

executing, at a computing device having a multi-point touch screen and a processor, a media viewing application that provides personalized on-demand viewing functionality;

while the media viewing application is executing, displaying a Graphical User Interface (GUI) on the multi-point touch screen, the GUI having a first media viewing portion and a plurality of graphically depicted media controls including graphically depicted sliders, buttons, and/or dials;

while the media viewing application is executing, transmitting a request to an on-demand personalized media server to generate an on-demand personalized news program, the request including a user identifier;

while the media viewing application is executing, receiving a content stream from the on-demand personalized media server comprising metadata associated with content, said content stream based and explicit constraints associated with the user identifier, wherein one of the explicit constraints comprises a duration for the on-demand personalized news program organized in a plurality of variable duration topical sections including a first topical section and a second topical section, each of the topical sections comprising a plurality of news content items relating to the topical section, wherein the implicit constraints comprises a viewing behavior and a story history for the user identifier, the viewing behavior further comprises a correlation between a sequence of varied length news story items viewed by a user for each of the plurality of topical sections associated with the user identifier and a frequency of news story items skipped by the user for each of the plurality of topical sections, the content stream comprising a plurality of associated news content items and advertisement content to form a personalized news program, the story history further comprising user feedback based on an editorial categorization, a story mood and a story format of each of the varied length news story items;

setting characteristics of the on-demand personalized news program, including an order and duration for each of the plurality of the topical sections, and a number of news contents for each of the plurality of news content items based on the implicit constraints, and metadata associated with the news content items, wherein the first topical section is set in the content stream preceding the second topical section, a duration of the first topical section is greater than a duration of the second topical section and a number of news content items in the first topical section is greater than a number of the news content items in the second topical section, all based on a determination that a user associated with the user identifier has a preference for the first topical section over the second topical section:

selecting content for the on-demand personalized news program for each of the topical sections based on the explicit constraints the implicit constraints and metadata associated with the news content, and the characteristics of the on-demand personalized news program, the selected news content sufficient to fill the duration of each of the topical sections and the user defined duration of the on-demand personalized news program;

generating the on-demand personalized news program based on the selected news content; and while the media viewing application is executing, displaying a first item of the plurality of associated news content items and advertisement content through first media viewing portion of the GUI for display on the multi-point touch screen of the computing device according to the characteristics of the on-demand personalized news program.

3. The method of claim 2, further comprising identifying a plurality of distinct graphically depicted controls that are associated with the plurality of simultaneous touch inputs on the multi-point touch screen, wherein each respective touch input in the plurality of simultaneous touch inputs on the multi-point touch screen corresponds to a different graphically depicted media control in the plurality of distinct graphically depicted media controls.

4. The method of claim 3, further comprising displaying a second news content item of the plurality of associated news content items through the first media viewing portion of the GUI for display on the multi-point touch screen of the computing device in response to a swipe movement on the multi-point touch screen associated with the first news content item of the plurality of associated news content items.

5. An electronic device, comprising:

a multi-point touch screen;

a processor;

a memory; and one or more programs, wherein the one or more programs are stored in the memory and configured to be executed by the processor, the one or more programs including instructions for executing a media viewing application that provides personalized on-demand viewing functionality; while the media viewing application is executing, displaying a Graphical User Interface (GUI) on the multi-point touch screen, the GUI having a first media viewing portion and a plurality of graphically depicted media controls including graphically depicted sliders, buttons, and/or dials;

while the media viewing application is executing, transmitting a request to an on-demand personalized media server to generate an on-demand personalized news program organized in a plurality of variable duration topical sections, including a first topical section and a second topical section, each of the topical sections comprising a plurality of news content items relating to the topical section, the request including a user identifier;

while the first media viewing application is executing, receiving a content stream from the on-demand personalized media server comprising metadata associated with content, said content stream based on implicit constraints associated with the user identifier and explicit constraints associated with the user identifier, and metadata associated with the content, wherein one of the explicit constraints comprises a duration for the on-demand personalized news program, wherein the implicit constraints comprises a viewing behavior and a story history for the user identifier, the viewing behavior further comprises a correlation between a sequence of varied length news story items viewed by a user for each of the plurality of topical sections associated with the user identifier and a frequency of news story items skipped by the user for each of the plurality of topical sections, the content stream comprising a plurality of associated news content items and advertisement content to form a personalized news program, the story history further comprising user feedback based on an editorial categorization, a story mood and a story format of each of the varied length news story items;

wherein the on-demand personalized news program has characteristics associated therewith, including an order and duration for each of the plurality of the topical sections, and a number of news contents for each of the plurality of news content items based on the implicit constraints and metadata associated with the news content items;

wherein the first topical section is set in the content stream preceding the second topical section, a duration of the first topical section is greater than a duration of the second topical section, and a number of news content items in the first topical section is greater than a number of the news content items in the second topical section, all based on a determination that a user associated with the user identifier has a preference for the first topical section over the second topical section;

wherein content for the on-demand personalized news program for each of the topical sections is selected for the content stream based on the explicit constraints, the implicit constraints, and metadata associated with the news content, and the characteristics of the on-demand personalized news program, the selected news content sufficient to fill the duration of each of the topical sections and the user defined duration of the on-demand personalized news program; and while the media viewing application is executing, transmitting a first news content item of the plurality of associated news content items through the first media viewing portion of the GUI for display on the multi-point touch screen of the computing device.

6. The device of claim 5, wherein the GUI further comprises a second portion to indicate an upcoming news segment of the plurality of associated news content items.

7. The device of claim 5, wherein at least one of the plurality of graphically depicted media controls comprises a sharing option to share the news content item.

\* \* \* \* \*